United States Patent
Grana

(10) Patent No.: US 11,708,286 B2
(45) Date of Patent: Jul. 25, 2023

(54) HIGH RATE THICKENER AND EDUCTORS THEREFOR

(71) Applicant: Marmon Industrial Water LLC, Warren, NJ (US)

(72) Inventor: Carlos Grana, Phillipsburg, NJ (US)

(73) Assignee: Marmon Industrial Water LLC, Warren, NJ (US)

( * ) Notice: Subject to any disclaimer, the term of this patent is extended or adjusted under 35 U.S.C. 154(b) by 398 days.

(21) Appl. No.: 16/997,211

(22) Filed: Aug. 19, 2020

(65) Prior Publication Data

US 2022/0055935 A1 Feb. 24, 2022

(51) Int. Cl.
| | |
|---|---|
| *C02F 11/121* | (2019.01) |
| *B01D 21/00* | (2006.01) |
| *B01D 21/01* | (2006.01) |
| *B01D 21/24* | (2006.01) |
| *B01F 23/451* | (2022.01) |
| *B01F 25/312* | (2022.01) |
| *C02F 11/14* | (2019.01) |
| *B01F 101/00* | (2022.01) |

(52) U.S. Cl.
CPC ........ *C02F 11/121* (2013.01); *B01D 21/0045* (2013.01); *B01D 21/01* (2013.01); *B01D 21/2416* (2013.01); *B01F 23/451* (2022.01); *B01F 25/31243* (2022.01); *C02F 11/14* (2013.01); *B01F 2101/305* (2022.01); *C02F 2301/024* (2013.01)

(58) Field of Classification Search
None
See application file for complete search history.

(56) References Cited

U.S. PATENT DOCUMENTS

| | | |
|---|---|---|
| 6,235,107 B1 | 5/2001 | Yuan |
| 6,346,069 B1 | 2/2002 | Collier |
| 7,244,361 B2 | 7/2007 | Dwyer |
| 7,314,441 B2 | 1/2008 | Collier |
| 8,628,735 B2 | 1/2014 | Bhaduri |

(Continued)

FOREIGN PATENT DOCUMENTS

| | | |
|---|---|---|
| AU | 598686 B | 10/1990 |
| AU | 1993036217 A1 | 9/1993 |

(Continued)

*Primary Examiner* — Clare M Perrin
(74) *Attorney, Agent, or Firm* — DeLio Peterson & Curcio LLC; Robert Curcio

(57) ABSTRACT

A thickener for dewatering fluids having a vessel with a central well extending proximate a top portion of the vessel to a lower cone-shaped portion, a hindered settling zone, and a compressible sediment layer zone within the lower cone-shaped portion. Eductors housed in inlet wells have an inlet nozzle and a mixing tube to receive slurry to be treated and clear fluid to be mixed with the slurry. The fluid from the eductors is directed in counter circular paths via circular chambers situated proximate the inlet wells, such that fluid flowing in each direction collides and forms turbulence within the central well. Resultant fluid is directed into a lamella-type separator circumferentially located about a portion of the central well, having layered fluid paths directed radially outwards from said center longitudinal axis and upwards towards said vessel top portion through a conical, inclined fluid path, plate structure. The eductors are adjustable with a movable iris for limiting the amount of clear fluid exiting the eductor.

6 Claims, 13 Drawing Sheets

(56) References Cited

U.S. PATENT DOCUMENTS

| | | |
|---|---|---|
| 8,968,579 B2 | 3/2015 | Bjornson |
| 9,217,189 B2 | 12/2015 | Davidson et al. |
| 9,315,734 B2 | 4/2016 | Betzer-Zilevitch |
| 9,932,654 B2 | 4/2018 | Richardson et al. |
| 10,370,271 B2 | 8/2019 | Tripathy et al. |
| 2005/0040108 A1 | 2/2005 | Jay |
| 2006/0180551 A1 | 8/2006 | Beckman, III et al. |
| 2007/0193930 A1 | 8/2007 | Marsh |
| 2014/0150886 A1 | 6/2014 | Kan |

FOREIGN PATENT DOCUMENTS

| | | |
|---|---|---|
| AU | 1997036039 A1 | 3/1998 |
| AU | 2000011413 A1 | 5/2000 |
| AU | 2000072388 A1 | 6/2001 |
| AU | 2002100379 A4 | 8/2002 |
| AU | 2002328201 A1 | 6/2003 |
| AU | 2003209319 A1 | 9/2003 |
| AU | 2017279746 A1 | 7/2018 |
| CA | 2622385 | 8/2009 |
| CA | 2610122 C | 5/2015 |
| CA | 2823499 C | 9/2015 |
| EP | 1487585 B1 | 4/2009 |
| EP | 2773783 A1 | 9/2014 |
| EP | 3394301 B1 | 9/2019 |
| IN | 280MUM2005 A | 3/2007 |
| IN | 1781CHENP2006 A | 7/2007 |
| IN | 208362 B | 10/2008 |
| IN | 256503 B | 6/2013 |
| IN | 2605CHE2014 A | 6/2014 |
| IN | 503DEL2015 A | 8/2016 |
| SG | 86711 A1 | 3/2002 |
| WO | 1993016961 A1 | 9/1993 |
| WO | 2000028099 A1 | 5/2000 |
| WO | 2001016591 A1 | 3/2001 |
| WO | 2002016262 | 2/2002 |
| WO | 2006016378 A1 | 2/2006 |
| WO | 2006056645 A1 | 6/2006 |
| WO | 2011035380 A1 | 3/2011 |
| WO | 2012051424 A3 | 4/2012 |
| WO | 2014082113 A1 | 6/2014 |
| WO | 2019027314 A1 | 2/2019 |
| WO | 2019028497 A1 | 2/2019 |

HIGH RATE THICKENER AND EDUCTORS THEREFOR

BACKGROUND OF THE INVENTION

1. Field of the Invention

The present invention relates to industrial and municipal thickeners and the process for dewatering fluids which contain a fraction of solids, otherwise referred to as slurries. More specifically, the present invention defines the design of a high rate thickener which employs a center well with adjustable eductors, which can be applied to both conventional and deep bed thickeners to increase the settling capacity of the units.

2. Description of Related Art

In mineral based, petrochemical, environmental, or water treatment industries, the separation of solids from the carrier fluid is an important and necessary part of the process. All the mineral based industries need a large quantity of water for processing the materials. Recovery and recycle of water back to process is done by sedimentation equipment known as thickeners. The separation component of the process may seek to recover the solids as a valued product, or eliminate the solids as an undesirable element. In either case, recovering and recycling the water is a necessary and desired condition.

In order to achieve separation of the solids from the carrier fluid (typically water), settling of the solids is initiated and preferably expedited. The time required for settling of the solids varies considerably depending on many factors which include the nature of the solid particles, the characteristics of the carrier fluid, the shape and size of the settling tank, and the degree of dilution of the slurry (among other factors).

There are two types of thickeners commercially available for this purpose: conventional thickeners and deep bed thickeners.

Conventional low profile thickeners rely on the radial expanse of the horizontal settling zones to effect settling of the slurry throughout the thickener. To achieve this settling action, the influent feed is typically dispersed outwardly in a radial direction from the central feed well and rotating rake arms gather and laterally direct the settled solids along the thickener/clarifier bottom to the central discharge opening in the bottom of the thickener/clarifier tank. Consistent with this purpose, the rake arms are rotated at a very slow speed usually on the order of less than 1 revolution per minute.

The conventional low profile thickener employs large horizontal areas relative to fluid flow rate to achieve settling. This action takes place in accordance with the predictions of Stokes' law and is proportional to the horizontal area of the vessel.

In a conventional thickener the space requirement is large, the settling rate is slow, the maintenance requirement is quite high, and the capital cost is high.

In contrast, a "high rate" or "deep bed" thickener/clarifiers rely on the height of the hindered settling to cause separation of the slurry into its clarified liquid and settled solids phases. Deep bed thickeners/clarifiers further typically have a deep, high angle conical bottom for directing the settled solids toward the discharge opening. Thus, there is no need for rotating rakes to move the solids within the thickener/clarifier to effect removal of the solids.

Deep bed thickeners generally have small diameters in comparison to the conventional type, but are of much greater vertical dimension or height. The deep bed thickener seeks to increase the density of the solids which accumulate at the bottom by means of the compressive action of the hydraulic forces which are generated by the greater heights of these units.

Reference may be made to U.S. Pat. Nos. 6,855,262; 7,235,182; and; 7,591,946, wherein conventional thickeners have been described, and to U.S. Pat. Nos. 2,570,304; 5,433,862; 5,549,827; and 6,758,978, wherein deep bed thickeners have been described.

Some limitations of the above thickeners are as follows: a) they cannot operate at the point of optimal solids fraction; b) they have no means of adjusting the operating point so as to move it to the optimal solids fraction; and c) they do not direct the internal flow such that the solids rain down impinging off one another to increase size and velocity of descent, thus raising separation efficiency. It will be shown that the aforementioned deficiencies may be addressed and mitigated entirely by the internal configuration of the vessel as well as a novel eductor design, and without need for external power or other agent.

As noted above, deep bed thickener/clarifiers are known in the art. Typically, a zoned vessel is utilized with a rotating rake shaft. For example, in U.S. Pat. No. 6,758,978 issued on Jul. 6, 2004 titled "DEEP BED THICKENER/CLARIFIERS WITH ENHANCED LIQUID REMOVAL," an enhanced deliquifying of a compacted bed of deep bed thickener/clarifier is disclosed. A vessel receives a slurry of liquid and solid particles suspended in the liquid, the vessel having a free settling zone, an intermediate hindered settling zone, a clarification zone, and a lower compaction zone. A rotating rake shaft with pickets is designed to release interstitial liquid trapped in a lower zone. The released liquid travels upwards freeing the lower zone of interstitial water.

Generally, an option of using a rakeless design may also be utilized. In this case, the cost and complexity of a mechanical drive is traded off for a deep bed and a steeper 60° floor slope; however, rakeless designs of the prior art do not achieve the same underflow density as a paste thickener with rake and pickets, but generally it can be more economical.

Overall, a diluted solid will generally exhibit a higher rate of settling; however, the settling of fluids with a high concentration of solids remains problematic. Solids interact with each other and impede flow towards the bottom of the vessel. It is necessary to provide a thickener/clarifier capable of addressing and separating from the carrier fluid a high volume of solids in the system.

SUMMARY OF THE INVENTION

Bearing in mind the problems and deficiencies of the prior art, it is therefore an object of the present invention to increase the rate of settling of said solids by a novel use of the existing known characteristics of solids in suspension in a fluid.

It is another object of the present invention to provide a more efficient way to separate solids from a fluid without further introducing energy into the process.

The above and other objects, which will be apparent to those skilled in the art, are achieved in the present invention which is directed to a thickener for dewatering fluids which contain a fraction of solids in the form of a slurry, the thickener comprising: a vessel having a top portion and a center longitudinal axis, a central well extending proximate the top portion to a lower cone-shaped portion of the vessel, the central well centered about the center longitudinal axis; a hindered settling zone and a compressible sediment layer zone within the lower cone-shaped portion; at least two inlet wells for fluid ingress into the central well; an eductor housed in each of the at least two inlet wells, the eductor including an inlet nozzle and a mixing tube, each of the eductors in fluid communication with, and receiving ingress fluid to be treated from, the inlet nozzle; the mixing tube fixedly attached to the inlet well, circumferentially housing the inlet nozzle, such that a first fluid traversing through the mixing tube is separated from the ingress fluid to be treated traversing through the inlet nozzle until the first fluid and the ingress fluid to be treated exit the mixing tube into the central well; first and second circular rings or chambers, one for each of the inlet wells, the circular rings or chambers situated proximate the inlet well respectively and directing fluid exiting the mixing tube into a circular path, the first circular ring or chamber directing fluid exiting the mixing tube in a clockwise direction and the second circular ring or chamber directing fluid exiting the mixing tube in a counterclockwise direction, such that fluid flowing in each direction collides and forms turbulence within the central well; a lamella-type separator circumferentially located about a portion of the central well, and below the first and second circular rings or chambers, the lamella-type separator having layered fluid paths directed radially outwards from the center longitudinal axis and upwards towards the vessel top portion through a conical, inclined fluid path, plate structure; and a collection trough proximate the inlet well for recycling fluid exiting the lamella-type separator into the inlet well.

At least one of the eductors is adjustable for regulating fluid exiting the mixing tube into the circular ring to the central well.

In a second aspect, the present invention is directed to an adjustable eductor for regulating fluid in a thickener process vessel, the adjustable eductor comprising: an inlet nozzle having an ingress port for receiving a fluid slurry and an egress port for transporting the fluid slurry away from the eductor; a mixing tube circumferentially housing the inlet nozzle, the mixing tube having an ingress port for receiving clear fluid relative to the fluid slurry; an adjustable iris located at the mixing tube egress port, the adjustable iris having an open state where a maximum amount of clear fluid flows from the mixing tube egress port, a closed state where approximately no clear fluid flows from the mixing tube egress port, and a partially open state where a regulated amount of clear liquid flows from the mixing tube egress port.

The adjustable eductor may include an iris mechanically and rotatably actuated by a sprocket and chain rotation.

In a third aspect, the present invention is directed to a thickener for dewatering fluids which contain a fraction of solids in the form of a slurry, the thickener comprising: a vessel having a top portion and a center longitudinal axis, a central well extending proximate the top portion to a lower cone-shaped portion of the vessel, the central well centered about the center longitudinal axis; a hindered settling zone and a compressible sediment layer zone within the lower cone-shaped portion; at least two inlet wells for fluid ingress into the central well; an adjustable eductor housed in each of the at least two inlet wells, the eductor comprising an inlet nozzle having an ingress port for receiving a fluid slurry and an egress port for transporting the fluid slurry away from the eductor; a mixing tube circumferentially housing the inlet nozzle, the mixing tube having an ingress port for receiving clear fluid relative to the fluid slurry; an adjustable iris located at the mixing tube egress port, the adjustable iris having an open state where a maximum amount of clear fluid flows from the mixing tube egress port, a closed state where approximately no clear fluid flows from the mixing tube egress port, and a partially open state where a regulated amount of clear liquid flows from the mixing tube egress port; the mixing tube fixedly attached to the inlet well, circumferentially housing the inlet nozzle, such that the clear fluid traversing through the mixing tube is separated from the ingress fluid slurry to be treated traversing through the inlet nozzle until the clear fluid and the ingress fluid slurry to be treated exit the mixing tube into the central well; first and second circular rings or chambers, one for each of the inlet wells, the circular rings or chambers situated proximate the inlet well respectively and directing fluid exiting the mixing tube into a circular path, the first circular ring or chamber directing fluid exiting the mixing tube in a clockwise direction and the second circular ring or chamber directing fluid exiting the mixing tube in a counterclockwise direction, such that fluid flowing in each direction collides and forms turbulence within the central well; a lamella-type separator circumferentially located about a portion of the central well, and below the first and second circular rings or chambers, the lamella-type separator having layered fluid paths directed radially outwards from the center longitudinal axis and upwards towards the vessel top portion through a conical, inclined fluid path, plate structure; and a collection trough proximate the inlet well for recycling fluid exiting the lamella-type separator into the inlet well.

In a fourth aspect, the present invention is directed to a process for dewatering fluids which contain a fraction of solids in the form of a slurry, the process comprising: introducing ingress slurry having sediment particles into a thickener vessel having a top portion, a central well, a bottom cone-shaped portion, and a center longitudinal axis; feeding a mixture of the ingress slurry and clear fluid into at least two eductors through an inlet nozzle and mixing tube in each eductor; streaming at least two counter directional fluids at one another from the at least two eductors to promote collision and turbulence in the central well generating a resultant disturbed fluid; directing the resultant disturbed fluid into a lamella type separator for removing the sediment particles from the resultant disturbed fluid; directing the resultant fluid upwards towards a collection trough, while allowing the sediment particles to flow downwards within the vessel under the force of gravity into a cone shaped portion of the vessel; and recycling fluid in the collection trough through the eductors.

The process may further include adjusting an iris located at the mixing tube egress port, the iris having an open state where a maximum amount of clear fluid flows from an egress port of mixing tube, a closed state where approximately no clear fluid flows from the mixing tube egress port, and a partially open state where a regulated amount of clear liquid flows from the mixing tube egress port.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-14 of the drawings in which like numerals refer to like features of the invention.

This invention relates to the separation of solids from a slurry of any kind which contains a high solids fraction or high percentage of solids.

All thickeners operate according to Stokes' law and exhibit distinct zones of compression or dilution which have been described throughout the art. Stokes' law essentially states that the force that retards a particle (idealized as a sphere) moving through a viscous fluid is directly proportional to the velocity of the particle, the radius of the particle, and the viscosity of the fluid. The most common description posits a clear zone of low solids at the top of the vessel, a hindered settling zone in the middle which bounds fluid of intermediate solids fraction, and a zone at the bottom representing a compressible sediment layer.

Alternately, these zones may be described as a clear solution zone at the top, followed by a recirculation zone, then a high dilution zone, followed by a low dilution zone, and finally an underflow zone. See, e.g., H. E. Cross, *Afr. Inst. Min. Metal!*, Vol. 63, February 1963.

Figure 1:
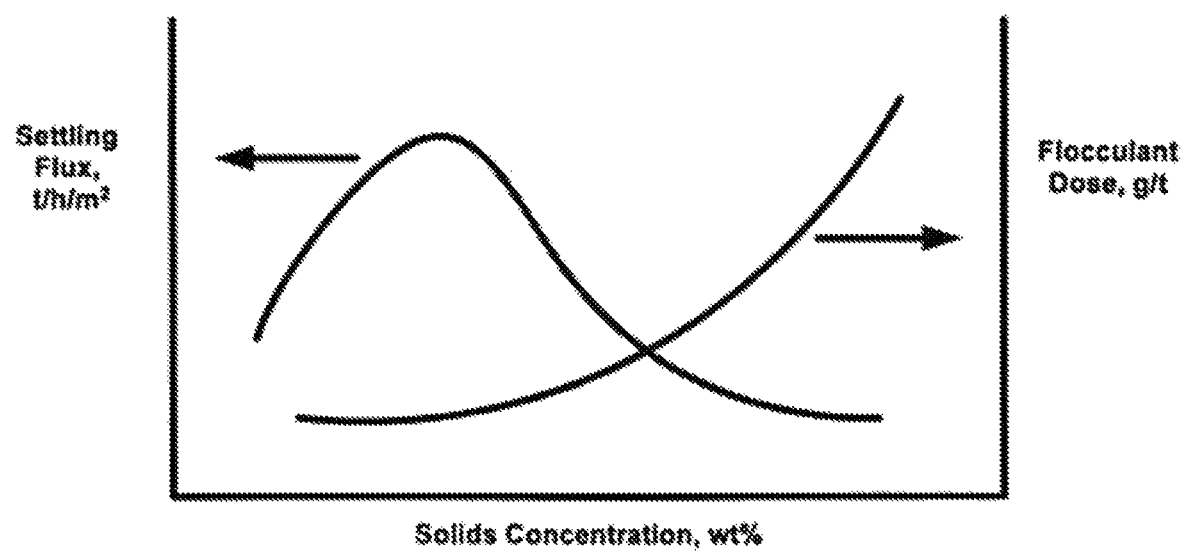
FIG. 1 depicts a generalized graph of settling flux rate against flocculant dose for particular solids concentration (by wt %)

FIG. 1 depicts a generalized graph of settling flux rate against flocculant dose for particular solids concentration (by wt %), which is broadly understood to demonstrate that the higher the solids fraction—the slower the settling velocity. This is due to solid particles hindering each other as they interact.

Figure 2:
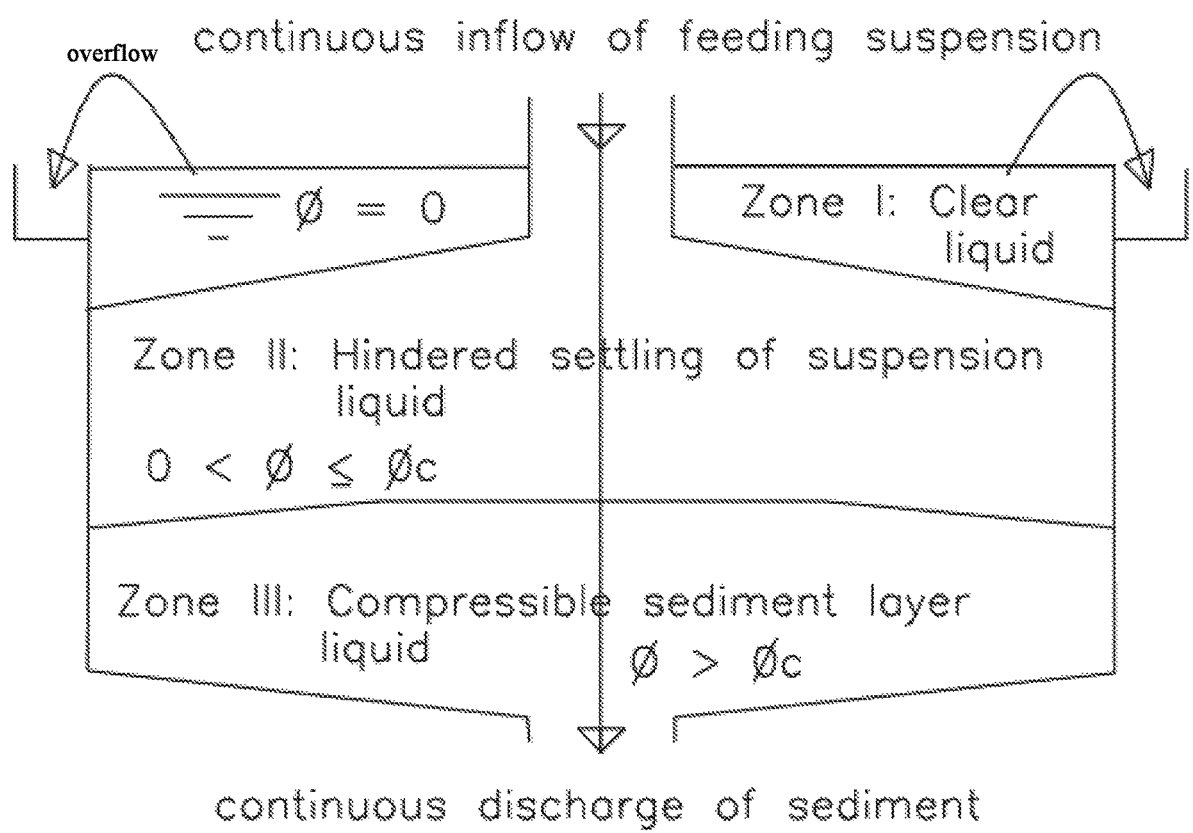
FIG. 2 depicts a schematic view of a continuous thickener, showing expected settling zones I, II, and III.

FIG. 2 depicts a schematic view of a continuous thickener, showing expected settling zones I, II, and III, where Zone I represents the region of clear liquid, Zone II represents the hindered settling of suspension; Zone III represents the compressible sediment layer; and φ represents the solids fraction in the fluid.

No matter the descriptive representation, all gravity driven settling devices exhibit these zones to varying extents of increasing solids fraction in continuous operation. A great leap in understanding occurred when characteristic velocity curves were first published. See, e.g., G. B. Wallis, *Proceedings of the Symposium on the Interaction between Fluids and Particles*, London: Institution of Chemical Engineers, 1963.

Such curves illustrated the fact that there is a percent of solids at which maximum settling velocity can be achieved. At points above and below this maximum value of solids fraction, the settling velocity of the solids diminishes. The resulting conclusion reached by this observation is that any thickener which can continuously operate at the optimum solids fraction will also exhibit the most rapid dewatering (separation of solids) for the incoming fluids.

Figure 3:
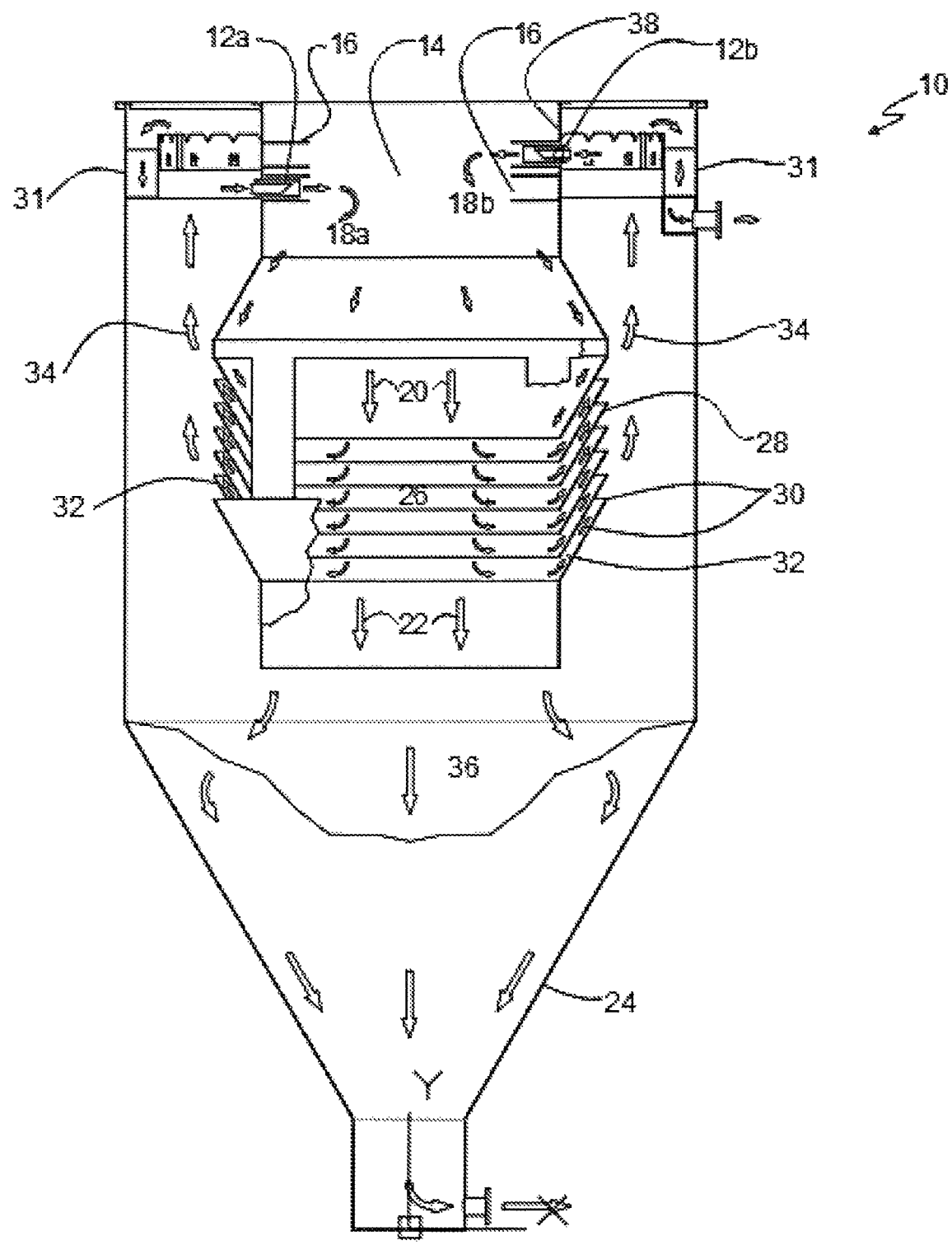
FIG. 3 depicts a high rate thickener vessel of the present invention with salient major elements identified.

FIG. 3 depicts a high rate thickener vessel 10 of the present invention with the major elements indicated by number, and arrows indicating the direction of flow.

As depicted, the present invention is focused on a thickener for dewatering fluids which contain a fraction of solids in the form of a slurry. The thickener comprises a vessel for dewatering (filtering) fluid. The vessel has a top portion and is defined with a center longitudinal axis. An internal or central well extends proximate the top portion to a lower cone-shaped portion of the vessel. The internal or central well is centered about the vessel's center longitudinal axis. The vessel has a defined hindered settling zone, and a compressible sediment layer zone within a lower cone-shaped portion. The lower cone shaped portion is preferable angled at about sixty (60) degrees, but may be other cone angles depending upon the sediment physical make up. The vessel has at least two inlet wells for fluid ingress into the internal or central well.

An eductor is housed in each of the at least two inlet wells, with the eductor including an inlet nozzle and a mixing tube. Each of the eductors is in fluid communication with, and receives ingress fluid to be treated (generally a sediment filled slurry) from, the inlet nozzle.

The mixing tube is fixedly attached to the inlet well, circumferentially housing the inlet nozzle, such that a first, generally a clear fluid, traversing through the mixing tube is separated from the ingress fluid to be treated traversing through the inlet nozzle until the first fluid and the ingress fluid to be treated (slurry) exits the mixing tube into the central well.

Below the eductors are at least first and second circular rings, one for each of the inlet wells. The circular rings are situated proximate the inlet wells respectively and direct fluid exiting each mixing tube into a circular path, where the first circular ring directs fluid exiting its mixing tube in a clockwise direction and the second circular ring directs fluid exiting its mixing tube in a counterclockwise direction, such that fluid flowing in each direction along the circular rings collides and forms turbulence within the central well. The collision and turbulence attributes to the immediate changes in kinetic energy of the slurry particles, which promotes separation.

This turbulence-generating action is performed without the need for introducing additional energy into the vessel, which typically comes in the form of pumps and motors. The clear fluid and untreated slurry may be mixed, and sediment particles removed from the mixed fluid, without additional mechanical devices. Although seemingly counter intuitive to form turbulence in the central well of the vessel in order to expedite separation, the counter-current jet streams of fluid accomplish this. The present invention provides for counter-current jet streams without having to implement pumps, motors, or other accessories that would require additional energy in the vessel. Thus, the present invention introduces efficient mixing and sediment particle separation without introducing energy into the system.

A lamella-type separator is circumferentially located about a portion of the central well, and below the first and second circular rings. The lamella-type separator includes layered fluid paths directed radially outwards from the vessel's center longitudinal axis and angled upwards towards in the direction of the vessel top portion through a conical, inclined fluid path, plate structure.

A collection trough is located proximate the inlet well for recycling fluid exiting the lamella-type separator into the inlet well.

Referring to FIG. 3, a circular flow path of fluid is generated internally within vessel 10. Fluid enters a central well 38 section of the vessel through two adjustable eductors 12a,b which entrain clear fluid 14 at the vessel top portion for the purpose of diluting the main untreated fluid stream (slurry). The untreated fluid and the clear fluid 14 are mixed by eductors 12a,b. Eductors 12a,b direct the mixed fluid into two circular chambers or rings 16. Strategic placement of eductors 12a,b in conjunction with circular chambers or rings 16 direct the flow from eductors 12a,b into two counter circular paths denoted by arrows 18a,b, which ultimately meet and interfere with one another proximate the center of the vessel 10, dissipating the fluid kinetic energy and causing turbulence prior to traversing a quiescent path in the direction of arrows 20 down the center well 38 of vessel 10. The collision of the counter current paths of fluid further enhances dilution and separation, ultimately causing the solids in the fluid to drop faster in the vessel. The liquid is then directed through a lamella type separator or separation portion or lamellar region 26 in what is considered an inverse-fashion, that is, the fluid is directed upwards through the lamella type separator 26. Propagation of clarified liquid is redirected radially outwards and upwards into a conical inclined plate area 28 in the direction of arrows 30 towards collection troughs 31. As will be shown below, this upward slope of the liquid contributes to the separation of a majority of the solids from the liquid. Solids drop downwards into the center of vessel 10. When traversing the conical inclined plate area 28, the liquid is directed in a sharp turn up slope 32. The clarified fluid continues upwards in the direction of arrows 34, towards a collection trough 31 where it can be recycled back into eductors 12a,b.

Because of low turbulence, as the liquid is directed radially outwards and upwards from the conical inclined plate area 28, gravitational forces direct the solids downwards within the center well 38 of vessel 10 in the direction of arrows 22 to collect in the cone area 24. The central well 38 of vessel 10 extends towards a hindered settling zone 36, which serves to capture any fines.

Figure 4:
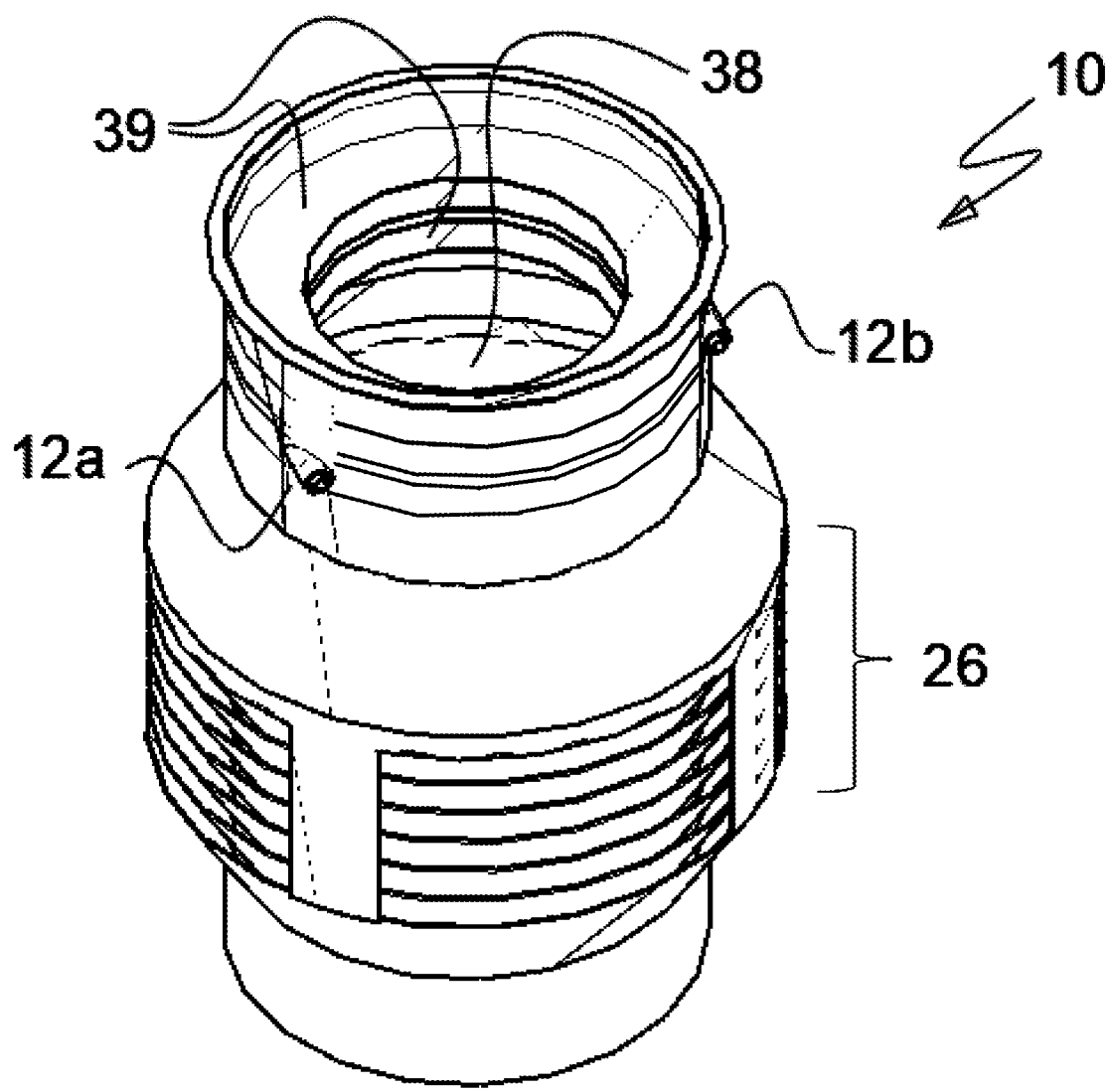
FIG. 4 is a top perspective view of the vessel of FIG. 3 depicting the central well.

FIG. 4 is a top perspective view of vessel 10 depicting central well 38. Central well 38 provides a pathway for efficient separation of the solids from the liquids. The lamella type separator 26 is shown about midway down the vessel. The two eductors 12a,b are depicted on the side of the vessel, and circular chambers or rings 39 direct fluid flow from the eductors 12a,b in a circular, rotating fashion about the inside of vessel 10.

Figure 5:
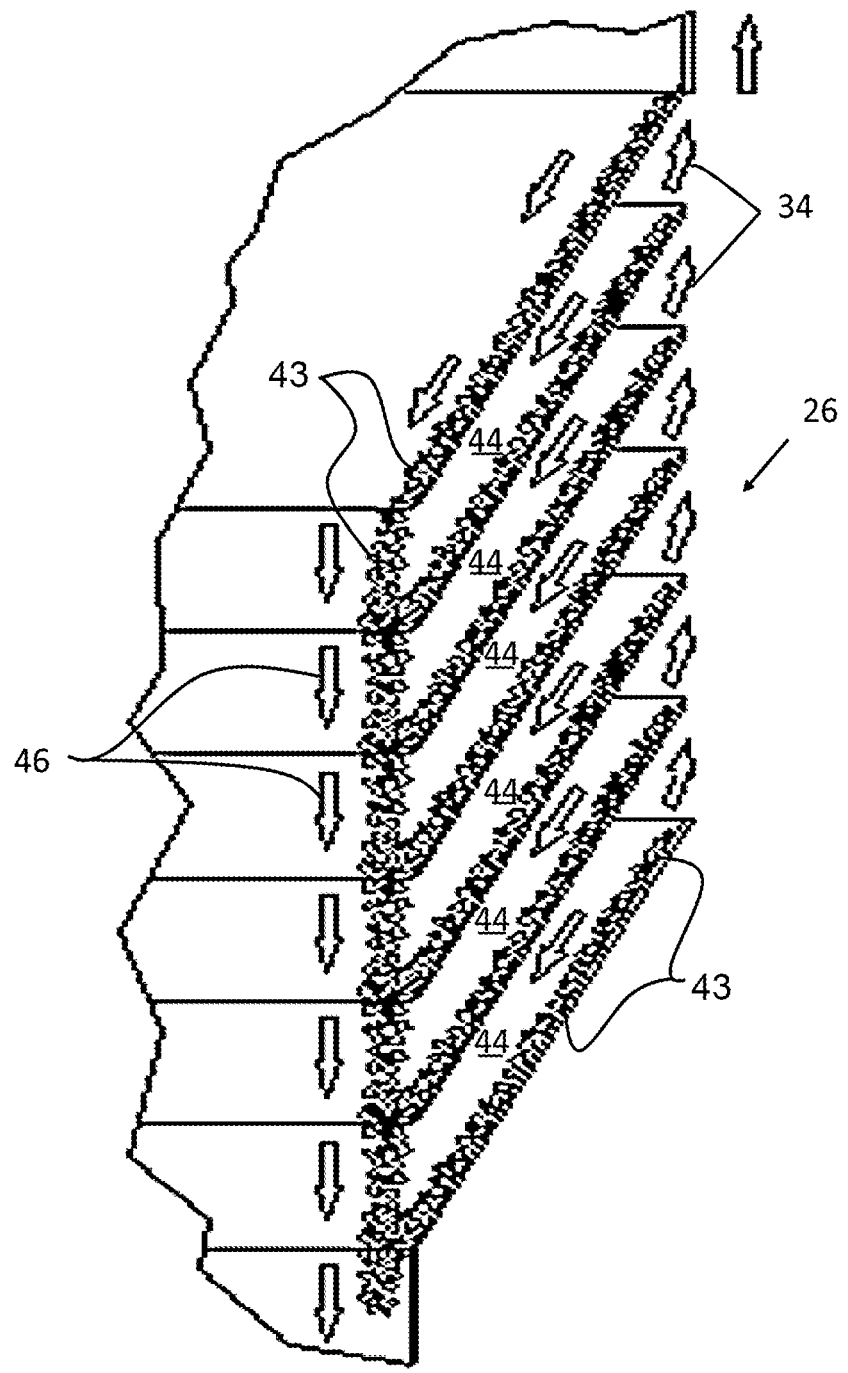
FIG. 5 depicts a partial, perspective cross-sectional view of the lamella type separation portion of the vessel of FIG. 3, and the directional fluid flow generated by this configuration.

FIG. 5 depicts a partial, perspective cross-sectional view of the lamella type separator 26 of vessel 10, and the directional fluid flow generated by this configuration. As fluids traverse through vessel 10 from eductors 12a,b, around circular chambers or rings 39, and down through central well 38, solids 43 are deposited on the sloped regions 44 of the lamella type separation portion 26, and subsequently join the main solid flow in the direction of arrows 46 down the center of the vessel. Clarified liquid continues upwards towards collector troughs 31 in the direction of arrows 34. Each lamellar region has a predetermined separation appropriate to the fluid being processed.

An unexpected result in overall settling efficiency was realized when the high solids feed was subject to enhanced dilution of the counter currents generated by the adjustable eductor placement, the circular chamber directed fluid, and the resulting colliding current streams. This design promotes higher efficiency settling, which directly correlates to physically smaller units and less expense to the end user.

Figure 6:
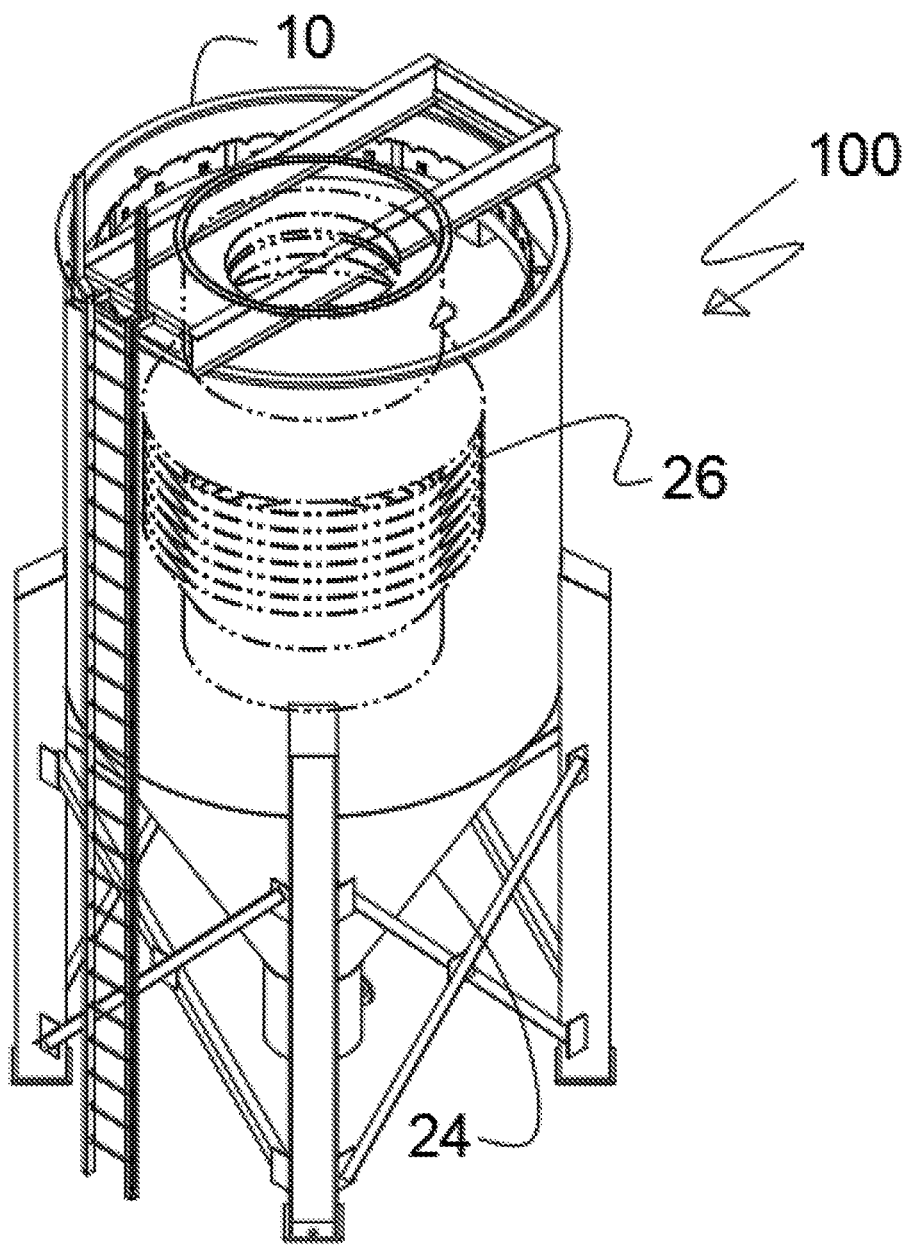
FIG. 6 depicts a perspective view of a complete thickener structure of the present invention.

FIG. 6 depicts a perspective view of a complete thickener structure 100 of the present invention. Although not held to any size constraints, typically the unit diameter is on the order of twelve feet with accompanying height of about twenty-four feet, and utilizing a sixty-degree conical bottom. Other conical angles are possible, and are predicted in part on the sediment material being separated. This particular thickener design need not require a rake. A salient feature of the system is the central well cavity 38 with circular chambers or rings designed to promote colliding fluid streams.

Figure 7:
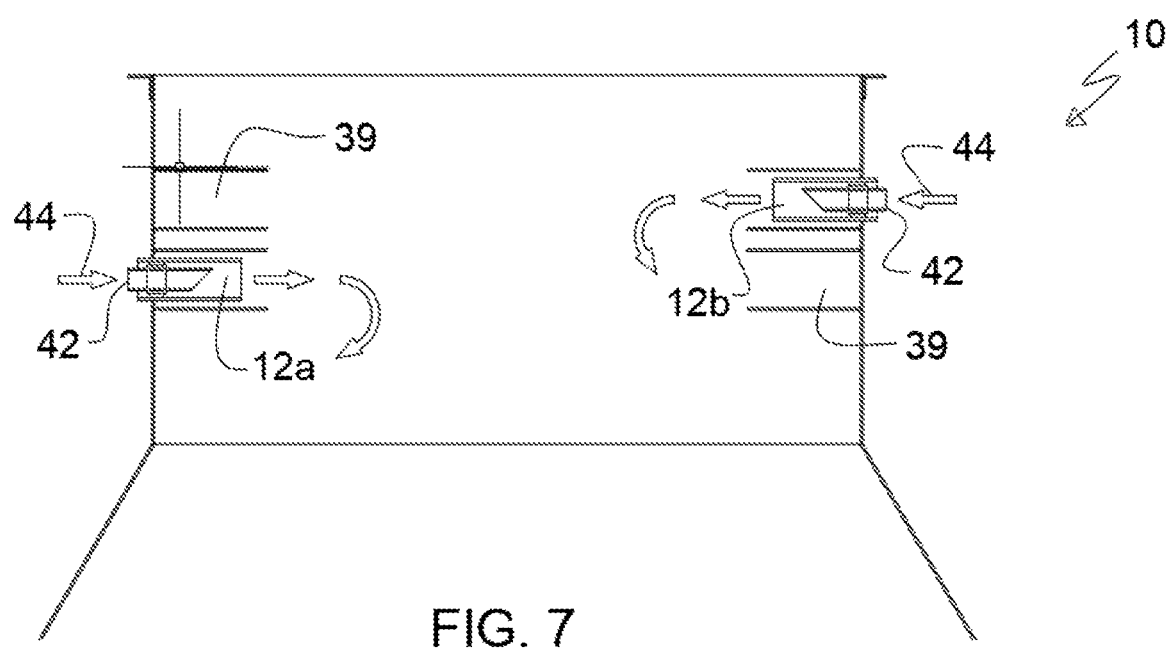
FIG. 7 depicts a cross-sectional view of the top portion of the vessel of the present invention with adjustable eductors for regulating fluid input.

FIG. 7 depicts a cross-sectional view of the top portion of vessel 10 with adjustable eductors 12a,b of the present invention for regulating fluid input. As depicted, the process fluid enters eductors 12a,b through centrally located ingress ports 42 in the direction of arrows 44. As shown, eductor 12a is situated below eductor 12b in the vertical direction. This positioning along with the placement of circular chambers or rings 39 facilitates the counter circular motion of the fluid exiting respective eductors. The kinetic energy of the process fluid presents the clarified fluid to the top of the high rate thickener and separates particles from the ingress slurry. The correct dilution ratio varies depending on the solids fraction contained within the fluid. Other factors such as temperature, the physical nature of the solids, and the viscosity/density of the carrier fluid affect optimization of the dilution ratio; however, theoretical calculations or laboratory analysis of the ratio remains a difficult endeavor.

Figure 8:
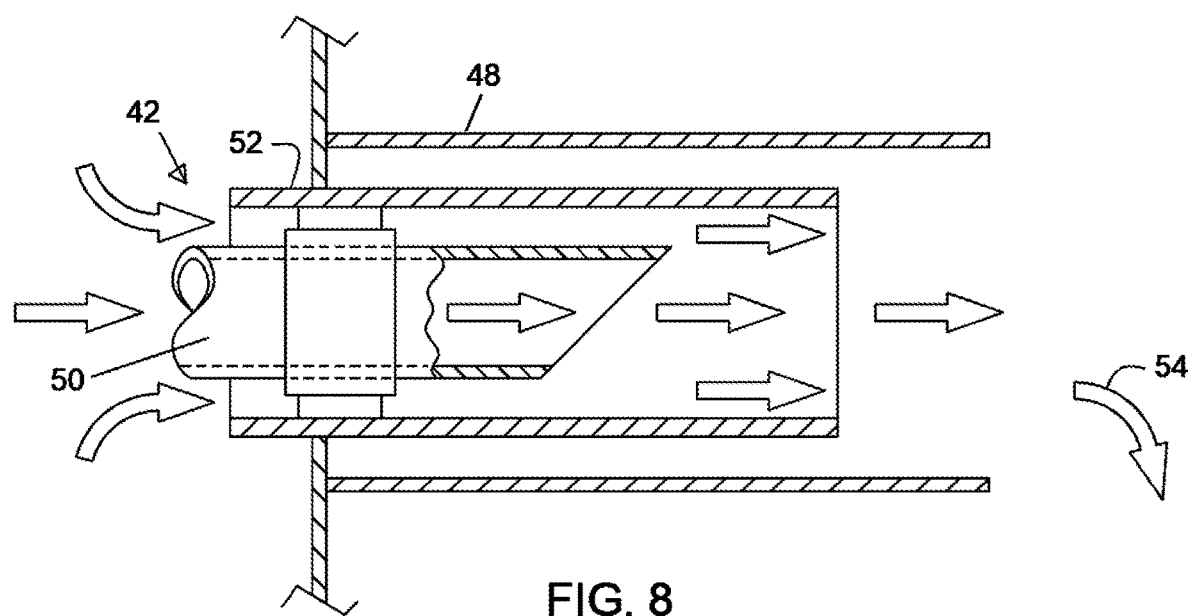
FIG. 8 depicts a cross-sectional view of a novel inlet well housing an adjustable eductor.

FIG. 8 depicts a cross-sectional view of a novel inlet well 48 housing an adjustable eductor 12. Each eductor takes its share of the flow through an ingress port 42 characterized by an inlet nozzle 50. Inlet nozzle 50 is housed within, and circumferentially surrounded by, a mixing tube 52, which is fixedly attached to inlet well 48. Clear fluid entering will travel through mixing tube 52, and slurry will enter into inlet nozzle 50. The fluids will then exit the inlet nozzle 50 and mixing tube 52 and enter the circular chambers of the circular rings 39 (not shown) in the direction of arrow 54.

The eductors are situated approximately diametrically opposed one another such that exiting fluid streams follow the circular chambers in counter-current paths. Essentially, fluid enters each eductor, which are positioned in different vertical planes—one above the other, into circular chambers or rings 39 designed to direct the fluid from one eductor to follow a circular path in a direction counter to fluid entering through the opposing eductor. Although counter-intuitive to settling dynamics, colliding two fluid streams flowing in opposite directions serves to diminish rapidly the solid concentration in the fluid, allowing the force of gravity to drive the solids towards the vessel center, and ultimately under gravitational forces, settling downwards within the vessel.

Figure 9:
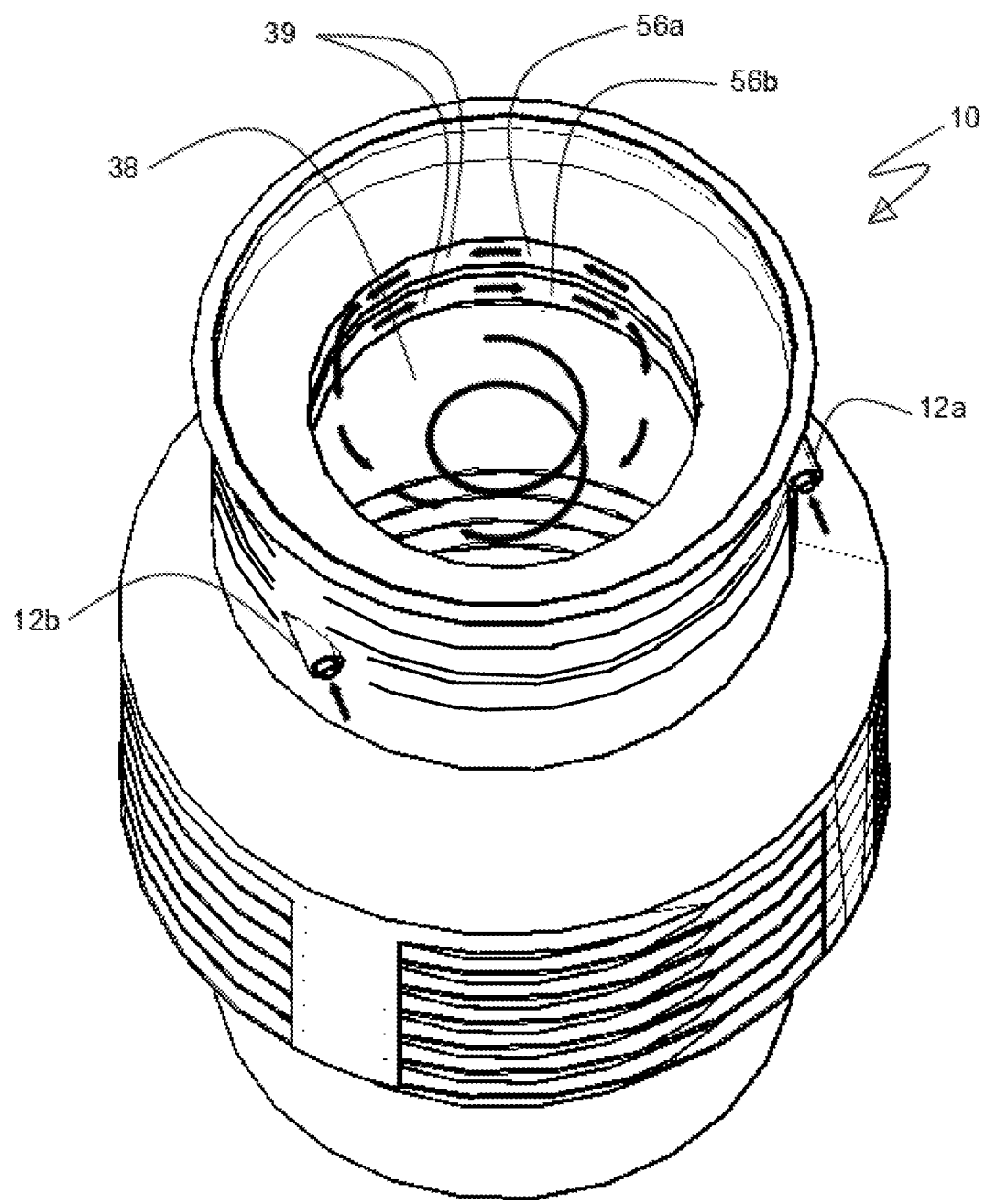
FIG. 9 depicts the counter-current paths created by fluid exiting the respective eductors of the vessel of FIG. 3.

FIG. 9 depicts the counter-current paths 56a,b created by fluid exiting the eductors 12a,b respectively of vessel 10. Circular rings 39 direct the entering fluid in opposite rotation. The opposing flows turbulently meet in the vessel central well 38 which attributes to the significant reduction in their respective kinetic energies, and the resultant fluid proceeds downwards through the inlet well. The central well 38 provides a pathway for the efficient separation of the solids from the liquids. As discussed above, the lamella type separator 26 significantly contributes to the separation, and redirects recycled fluid upwards towards collector troughs 31.

Figure 10:
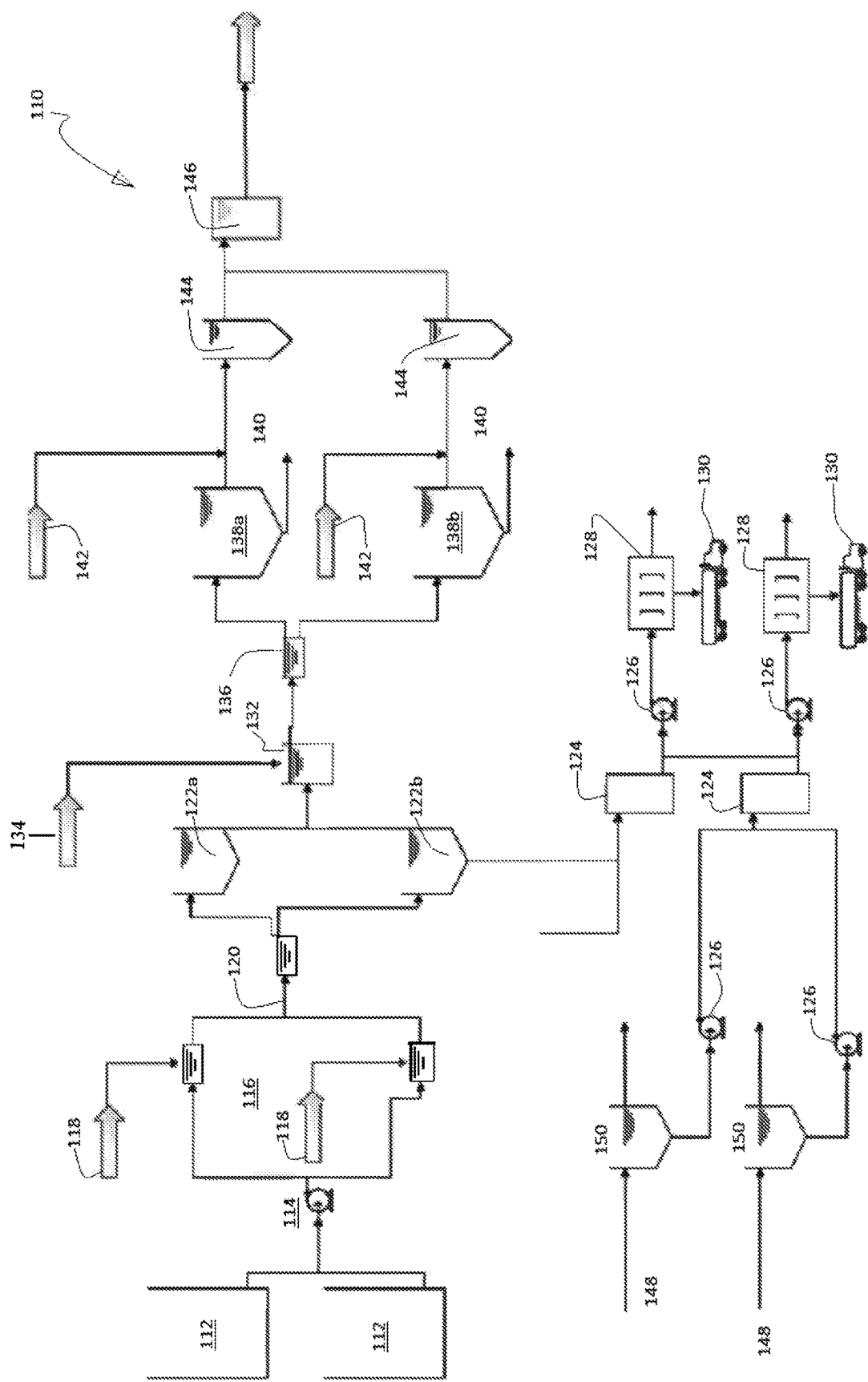
FIG. 10 depicts a general process flow diagram of a water treatment system which would utilize the thickener/clarifier design of the present invention.

FIG. 10 depicts a general process flow diagram of a water treatment system 110 which would utilize the thickener/clarifier design of the present invention. Equalization tanks 112 feed fluid via feed pump 114 into at least one flocculation tank 116, which are designed to receive and mix polymers 118. The output of each flocculation tank is divided via a splitter 120 into separate primary clarifiers 122a,b. Settled sludge/debris exits primary clarifiers 122a,b into sludge tanks 124 which are ultimately pumped 126 and filter pressed 128 for transport 130.

Secondary clarifiers 148 also feed additional thickeners 150, where settled sludge/debris exits into sludge tanks 124, and which are ultimately pumped 126 and filter pressed 128 for transport 130. Treated fluid from thickeners 150 is recycled back to the treatment system.

The clarified output of primary clarifiers 122a,b are fed into reaction tanks 132, typically three in series, and treated with a flocculant coagulant 134. The resultant fluid is then divided via splitter 136 into clarifiers 138a,b. Settled sludge/debris from clarifiers 138a,b is directed to thickeners 140, while the resultant output of each clarifier is subject to further treatment 142, which for exemplary purposes may be an acid treatment, fed to backwash filters 144, and ultimately stored in a treated effluent tank 146.

The aforementioned primary thickeners/clarifiers represent suitable placements for the novel inlet wells and eductors of the present invention.

Figure 11:
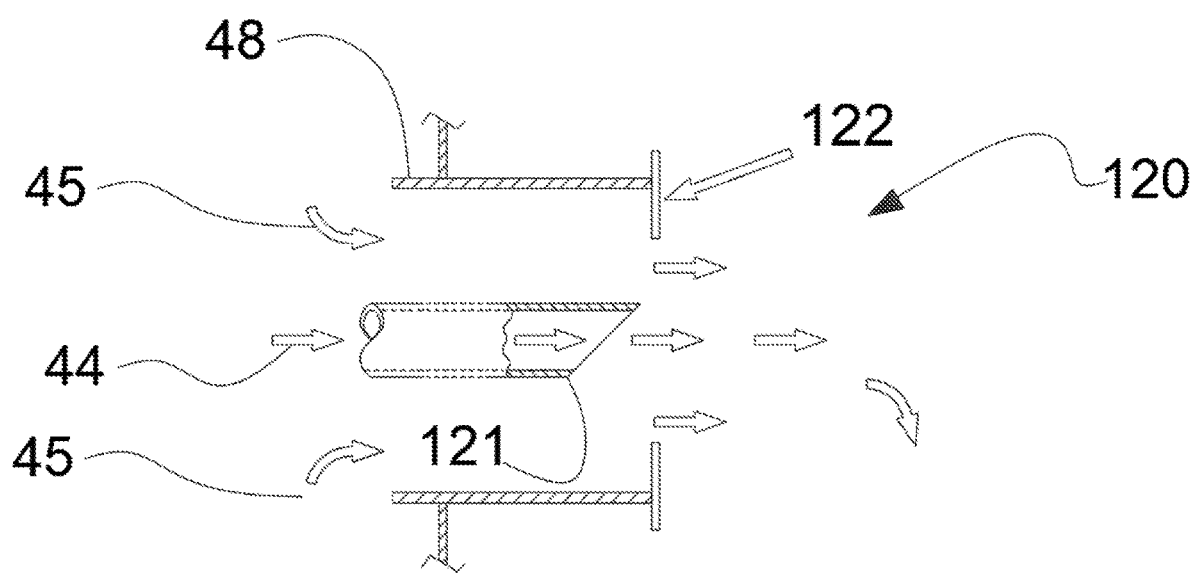
FIG. 11 depicts an adjustable eductor assembly 10 of the present invention.

Optimizing the dilution ratio is achieved by implementing adjustable eductors. FIG. 11 depicts the adjustable eductor assembly 120 of the present invention. In a first embodiment, adjustable eductors of the present invention employ a mechanical iris 122 which is introduced into the assembly of each eductor. Other expansion and contraction techniques may be employed to reduce or expand the inlet well 48 egress port, and the present invention is not limited solely to a mechanical iris design for regulating the egress from the inlet well. A flow regulator capable of limiting the amount of fluid that exits the inlet well would suffice to practice as an adjustable eductor. Similarly, a motorized iris remotely controlled would also be an effective flow regulator.

As depicted, the process fluid enters eductor inlet tube 121, which is smaller in diameter than the larger inlet well 48 ingress port. Inlet tube 121 is centrally located within inlet well 48 and receives fluid to be treated (slurry) in the direction of arrow 44. The ingress of inlet well 48 also allows for separate, clear fluid to enter circumferentially about inlet tube 121 in the direction of arrows 45 such that upon exiting the inlet well, the two fluids interact and mix together. The opening and closing of iris 122 regulates the amount of mixing of the two fluids by limiting how much clear fluid about the outside of inlet tube 121 is available to mix with fluid within inlet tube 121.

Iris 122 may be adjusted in a range from fully open to fully closed by the rotation automatically or manually of an adjustment ring located proximate the iris periphery. The degree of opening determines the quantity of clear fluid which is introduced into the fluid stream. Essentially, optimum dilution may be achieved by varying the mixture of untreated fluid and clear fluid.

Figure 12:
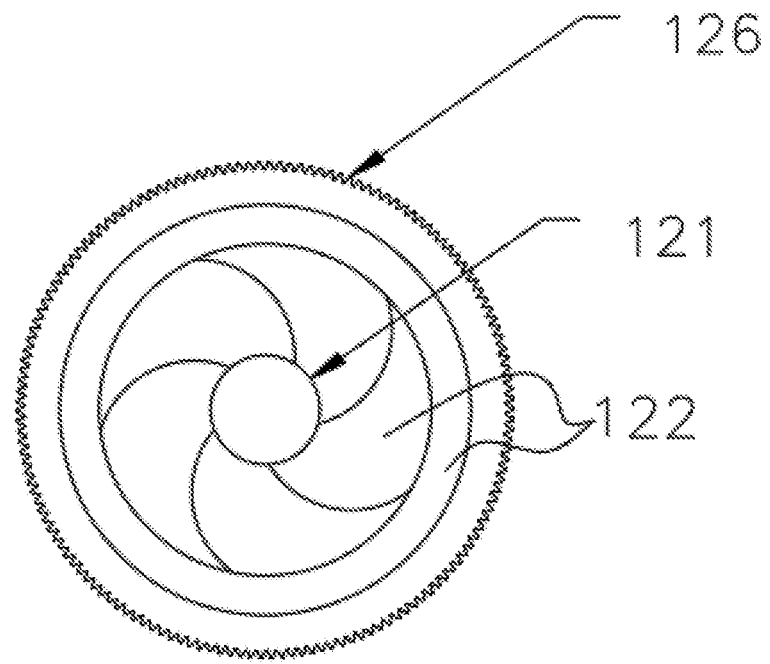
FIG. 12 depicts the egress side of inlet well with mechanical iris in a fully closed position.
Figure 13:
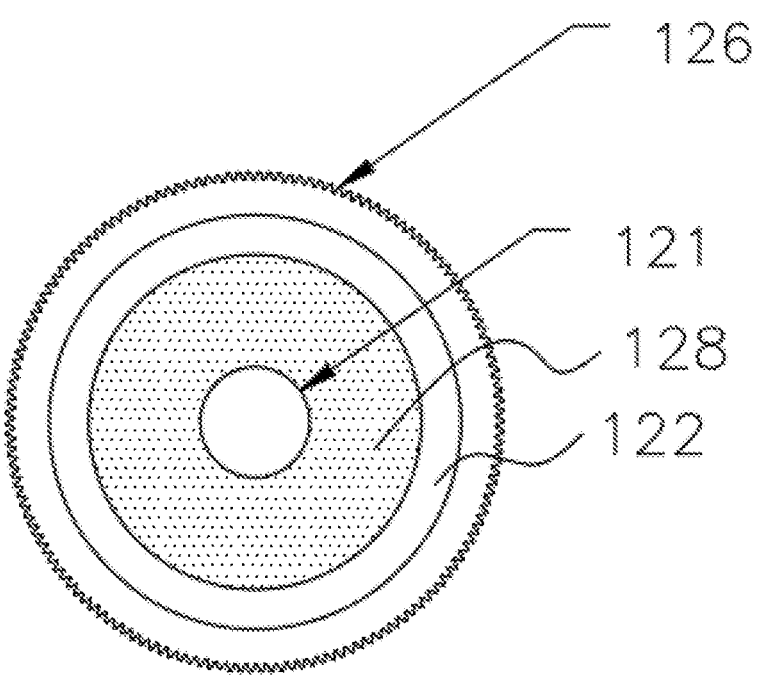
FIG. 13 depicts the egress side of inlet well with the mechanical iris in a fully open position.

In one embodiment, as depicted in FIGS. 12 and 13, an adjustment ring 126 is rotated, and the mechanical iris 122 expanded or contracted to effectuate the amount of opening or closing, thereby regulating the amount of mixing of the two separate fluid streams. FIG. 12 depicts the egress side of inlet well 48 with mechanical iris 122 in a fully closed position. In this position, no clear fluid can exit inlet well 48, and thus no mixing takes place with the untreated fluid exiting inlet tube 121. FIG. 13 depicts the egress side of inlet well 48 with mechanical iris 122 in a fully open position. In this position, a maximum amount of clear fluid 128 may be mixed with the untreated fluid flowing from the egress of inlet tube 121. Intermediate positions of the mechanical iris will allow for partial mixing adjustable by the user for selected, pre-determined mixing conditions.

Figure 14:
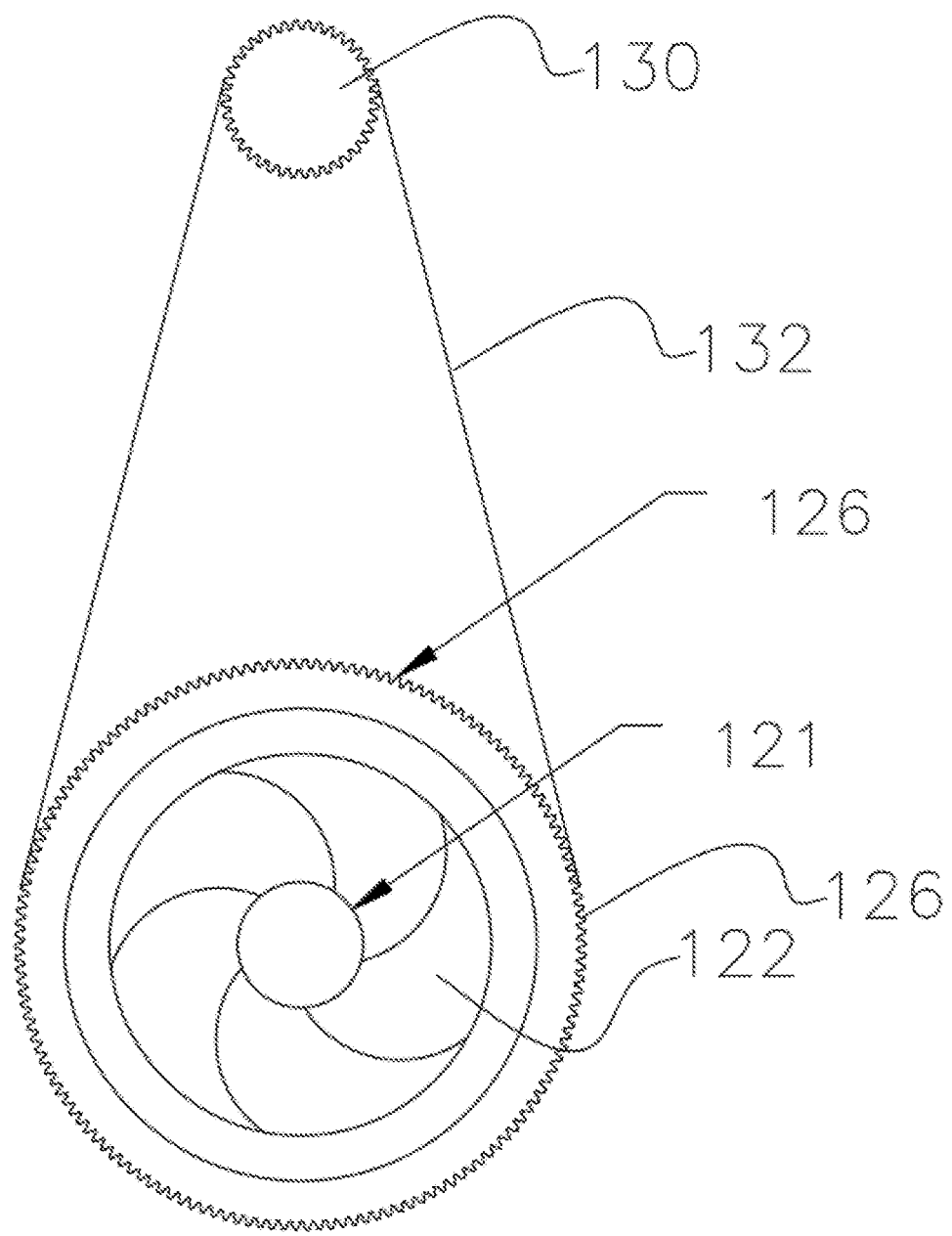
FIG. 14 depicts an adjustment ring for the mechanical iris of FIGS. 12 and 13, constructed in the form of a sprocket which may be rotated by means of a small chain.

As shown, in one embodiment, as depicted in FIG. 14, the adjustment ring 126 is constructed in the form of a sprocket 130 which may be rotated by means of a small chain 132 which preferably terminates above the water line.

The present invention is further directed to a process of dewatering a fluid slurry that provides for a thickener vessel capable of streaming two (or more) counter directional fluids at one another to promote collision and turbulence, and subjecting the disturbed fluids to a lamella type separator for removing sediment particles from the resultant fluid, and directing the resultant fluid upwards towards a collection trough, while allowing the sediment particles to flow downwards within the vessel under the force of gravity into a cone shaped portion of the vessel. Eductors that take ingress fluid and force it into the central well of the vessel, do so through an adjustable mechanical iris that regulates the amount of clear fluid that may be introduced within the central well with the slurry.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A thickener for dewatering fluids which contain a fraction of solids in the form of a slurry, said thickener comprising:
    a vessel having a top portion and a center longitudinal axis, a central well extending proximate said top portion to a lower cone-shaped portion of said vessel, said central well centered about said center longitudinal axis;
    a hindered settling zone and a compressible sediment layer zone within said lower cone-shaped portion;
    at least two inlet wells for fluid ingress into said central well;
    an eductor housed in each of said at least two inlet wells, said eductor including an inlet nozzle and a mixing tube, each of said eductors receiving ingress fluid to be treated from said inlet nozzle;

said mixing tube fixedly attached to said inlet well, circumferentially housing said inlet nozzle, such that a first fluid traversing through said mixing tube is separated from said ingress fluid to be treated traversing through said inlet nozzle until said first fluid and said ingress fluid to be treated exit said mixing tube into said central well;

first and second circular rings or chambers, one for each of said inlet wells, said circular rings or chambers situated proximate said inlet well respectively and directing fluid exiting said mixing tube into a circular path, said first circular ring or chamber directing fluid exiting a first mixing tube in a clockwise direction and said second circular ring or chamber directing fluid exiting a second mixing tube in a counterclockwise direction, such that fluid flowing in each direction collides and forms turbulence within said central well;

a separator circumferentially located about a portion of said central well, and below said first and second circular rings or chambers, said separator having layered fluid paths directed radially outwards from said center longitudinal axis and upwards towards said vessel top portion through a conical, inclined fluid path, plate structure; and a collection trough proximate said inlet well for recycling fluid exiting said separator into said inlet well.

2. The thickener of claim 1 wherein said lower cone-shaped portion forms approximately a 60° angle.

3. The thickener of claim 1 wherein said at least two inlet wells are located one higher than another in the direction parallel to said central longitudinal axis.

4. The thickener of claim 1 wherein said inlet wells are situated approximately diametrically opposed one another.

5. The thickener of claim 1 wherein at least one of said eductors is adjustable for regulating fluid exiting said mixing tube into said circular ring or chamber to said central well.

6. A thickener for dewatering fluids which contain a fraction of solids in the form of a slurry, said thickener comprising:

a vessel having a top portion and a center longitudinal axis, a central well extending proximate said top portion to a lower cone-shaped portion of said vessel, said central well centered about said center longitudinal axis;

a hindered settling zone and a compressible sediment layer zone within said lower cone-shaped portion;

at least two inlet wells for fluid ingress into said central well;

an adjustable eductor housed in each of said at least two inlet wells, said eductor comprising:

an inlet nozzle having an ingress port for receiving a fluid slurry and an egress port for transporting said fluid slurry away from said eductor;

a mixing tube circumferentially housing said inlet nozzle, said mixing tube having an ingress port for receiving clear fluid relative to said fluid slurry;

an adjustable iris located at said mixing tube egress port, said adjustable iris having an open state where a maximum amount of clear fluid flows from said mixing tube egress port, a closed state where approximately no clear fluid flows from said mixing tube egress port, and a partially open state where a regulated amount of clear liquid flows from said mixing tube egress port;

said mixing tube fixedly attached to said inlet well, circumferentially housing said inlet nozzle, such that said clear fluid traversing through said mixing tube is separated from said ingress fluid slurry to be treated traversing through said inlet nozzle until said clear fluid and said ingress fluid slurry to be treated exit said mixing tube into said central well;

first and second circular rings or chambers, one for each of said inlet wells, said circular rings or chambers situated proximate said inlet well respectively and directing fluid exiting said mixing tube into a circular path, said first circular ring or chamber directing fluid exiting said mixing tube in a clockwise direction and said second circular ring or chamber directing fluid exiting said mixing tube in a counterclockwise direction, such that fluid flowing in each direction collides and forms turbulence within said central well;

a separator circumferentially located about a portion of said central well, and below said first and second circular rings or chambers, said separator having layered fluid paths directed radially outwards from said center longitudinal axis and upwards towards said vessel top portion through a conical, inclined fluid path, plate structure; and a collection trough proximate said inlet well for recycling fluid exiting said separator into said inlet well.

* * * * *